United States Patent
Bern et al.

(10) Patent No.: US 7,116,772 B2
(45) Date of Patent: Oct. 3, 2006

(54) COMMUNICATION NETWORK

(75) Inventors: Sara Bern, Huddinge (SE); Mats Bern, Huddinge (SE); Stefan Björnson, Nynashamn (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 829 days.

(21) Appl. No.: 09/897,896

(22) Filed: Jul. 5, 2001

(65) Prior Publication Data

US 2002/0159578 A1 Oct. 31, 2002

Related U.S. Application Data (63) Continuation of application No. PCT/EP00/00048, filed on Jan. 5, 2000.

(30) Foreign Application Priority Data

Jan. 8, 1999 (EP) .................................. 99100273

(51) Int. Cl.
- *H04M 3/22* (2006.01)
- *H04M 3/42* (2006.01)
- *H04M 7/00* (2006.01)

(52) U.S. Cl. ............... 379/207.02; 379/35; 379/221.08
(58) Field of Classification Search .......... 379/221.08, 379/207.02, 35, 85, 144.04, 32.01, 32.02, 379/32.03, 32.04
See application file for complete search history.

(56) References Cited

U.S. PATENT DOCUMENTS

| | | | | |
|---|---|---|---|---|
| 5,467,388 A | * | 11/1995 | Redd et al. ............. | 379/210.02 |
| 5,668,862 A | * | 9/1997 | Bannister et al. ...... | 379/207.14 |
| 5,864,612 A | * | 1/1999 | Strauss et al. ......... | 379/142.03 |
| 5,923,744 A | * | 7/1999 | Cheng .................... | 379/221.09 |
| 6,078,648 A | * | 6/2000 | Albers et al. ................. | 379/35 |
| 6,370,241 B1 | * | 4/2002 | Clark ..................... | 379/144.01 |
| 6,498,843 B1 | * | 12/2002 | Cox ....................... | 379/207.02 |
| 6,504,907 B1 | * | 1/2003 | Farris et al. .................. | 379/35 |
| 6,665,376 B1 | * | 12/2003 | Brown ......................... | 379/85 |
| 2003/0108182 A1 | * | 6/2003 | Dikmen ..................... | 379/229 |

FOREIGN PATENT DOCUMENTS

| | | |
|---|---|---|
| EP | 0 792 074 A2 | 8/1997 |
| WO | 97/25828 | 7/1997 |
| WO | 97/41678 | 11/1997 |
| WO | 97/42784 | 11/1997 |
| WO | 98/36548 | 8/1998 |

* cited by examiner

*Primary Examiner*—Harry S. Hong
(74) *Attorney, Agent, or Firm*—Nixon & Vanderhye P.C.

(57) ABSTRACT

A communication network for transporting calls, where a service provision entity adds user identification information to call data of a call being set up by a non-dialable virtual subscription such that the subscriber behind the call being set up by the non-dialable virtual subscription may be identified at the network switching layer. This increases the manageability of the network and provides advantages for call interception.

43 Claims, 4 Drawing Sheets

COMMUNICATION NETWORK

This application is a continuation of Application No. PCT.EP00/00048, filed 5 Jan. 2000, the entire content of which is hereby incorporated by reference in this application.

TECHNICAL FIELD

The present invention relates to a communication network for transporting calls and to a corresponding method of arranging a communication network.

BACKGROUND

Figure 3:
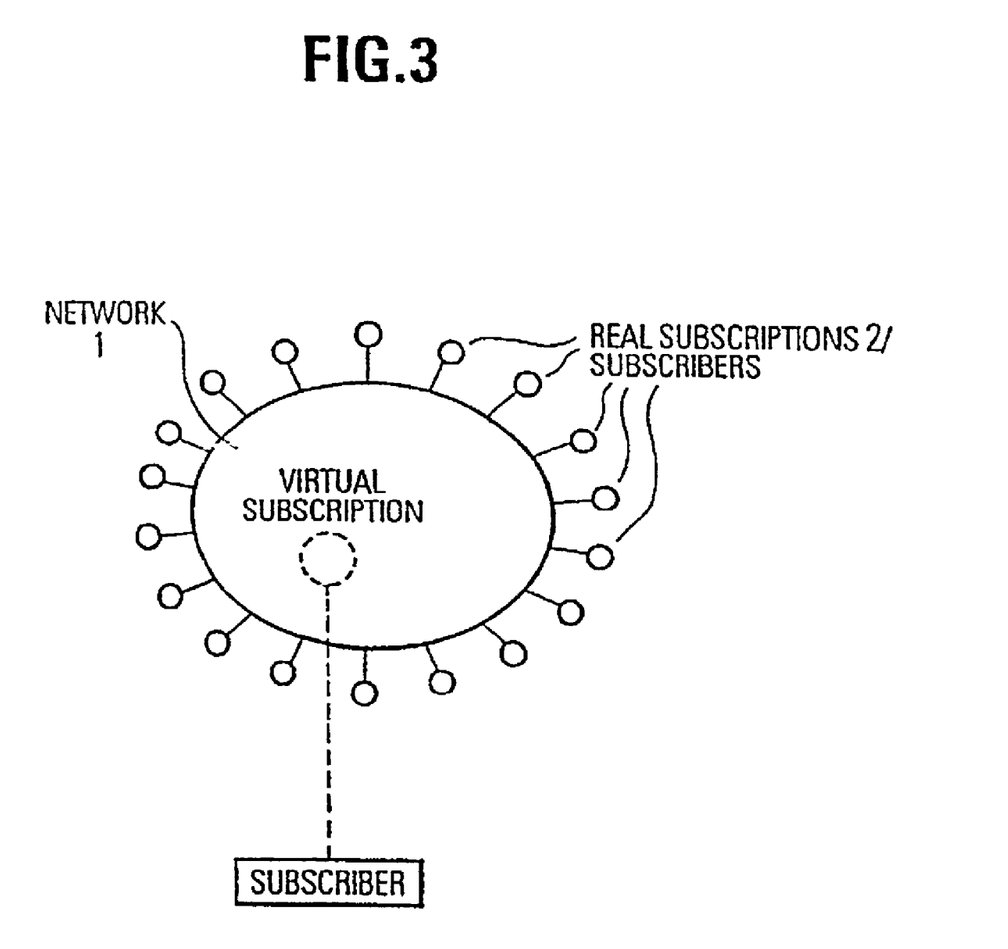
FIG. 3 is a schematic illustration of a network containing physical and virtual subscriptions.

Presently, telephone networks have come into use, which provide so-called intelligent network (IN) functions. One such intelligent network function is the possibility of so-called virtual subscriptions. This will be explained in connection with FIG. 3 FIG. 3 schematically shows a network 1 and physical or real subscriptions 2, which correspond to subscribers. Physical or real subscriptions are associated with a physical or logical line to the network. In other words, the physical or real subscription is associated with a predetermined access point to the network, be it a physical line as in a PSTN or be it a logical access point as in a mobile telephone system. As already mentioned, each such access-based subscription is directly associated with a subscriber.

Beyond this well-known arrangement that consists of physical subscriptions and a network for routing calls between these physical subscriptions, intelligent network functions provide new possibilities, such as virtual subscriptions, in which a subscriber has a subscription that is not associated with an access, however said subscription appears to the other subscriptions like a physical or real subscription.

This is accomplished by providing processing means in switch nodes of the network, which react to specific triggering methods in calls. Such triggering methods may use numbers that are placed in front of regular calling numbers, i.e. similar to the form of an area code. When the component in a switching node that is responsible for recognizing specific triggering numbers detects such a number, a predetermined process is initiated, e.g. contacting a specific entity that handles the service functions in the network. This specific entity may then invoke the service corresponding to the detected triggering number and perform corresponding actions. Other triggering methods may use the calling party number or the incoming route the call takes to the switch.

Figure 4A:
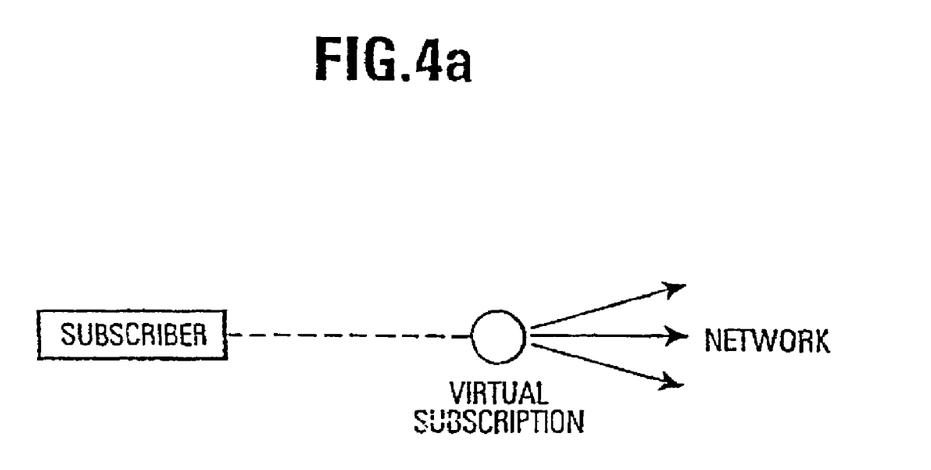
FIGS. 4a and 4b illustrate the concept of non-dialable and dialable virtual subscriptions.
Figure 4B:
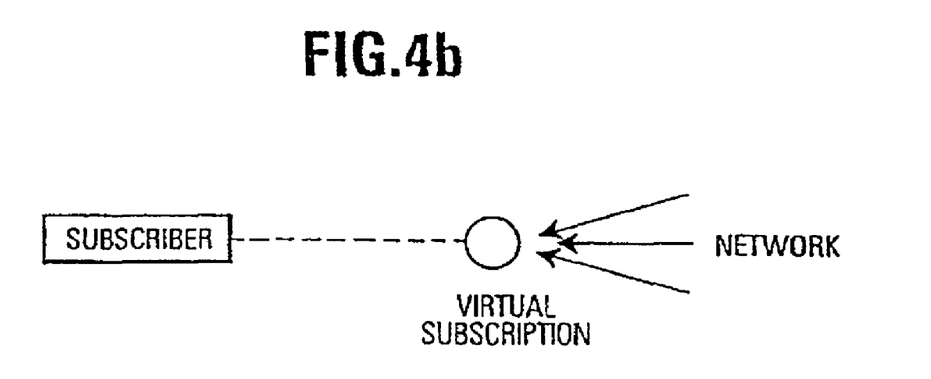

With respect to the above-mentioned virtual subscriptions, one may distinguish between dialable and non-dialable subscriptions, as indicated in FIG. 4a and FIG. 4b. FIG. 4a schematically represents a non-dialable virtual subscription, which means that the subscription is designed for outgoing calls, i.e. can only place calls. In other words, the subscriber to this non-dialable virtual subscription may only place calls, but no one can call this subscription from the network.

FIG. 4b shows a schematic illustration of a dialable virtual subscription, which means that the subscription is only designed for incoming calls, i.e. the subscriber to this subscription may only receive calls using a number known in the public number plan.

An example for a non-dialable subscription is an account-calling-card or a credit-card-calling service, where a subscriber dials a specific access number (this action invokes the service), and then the service itself collects an account number & PIN (personal identification number) in order to authenticate the virtual subscriber, thereafter the service helps place a call for the subscriber and performs a corresponding billing operation. As can be seen, the subscriber may only use this service to place calls, but cannot receive calls from other subscribers to the network. Examples for dialable subscriptions are free-phone and premium-rate-services. It should be noted that there may also exist services that are a combination of dialable and non-dialable subscriptions, such as so-called universal personal telecommunication (UPT), in which a subscriber to this service may both place and receive calls through the virtual subscription.

The possibilities of intelligent network functions are not restricted to virtual subscriptions, i.e. services associated with subscribers, but also extend to operations conducted by and for the network operator. Examples of this are the use of specific calling numbers or other information in a call for gathering statistical information for the benefit of the network provider. As an example, an intelligent network operation may be triggered by a specific area code during a specific period of time during the day, such that the network provider may evaluate how many calls are directed towards that area during that given period of time.

While the above-described intelligent network services and possibilities greatly increase the performance of the network, they also make the management more complicated, because the number of possible situations in the network greatly increases.

One aspect accompanying network management is that of lawful call interception. The inclusion of call interception functions in networks is required by law in many countries, in order to enable to a state agency such as the police to lawfully intercept calls in the network under predetermined conditions. The classical call interception method is access-based, i.e. calls of a specific subscriber are intercepted by monitoring the switching node at that subscriber's access point to the network. Another interception method is number-based, i.e. specific numbers trigger an interception routine in a given switching node carrying the interception function. Another method involving IN includes that a service control function (see later description of FIG. 1) sends an indication to a service switching function, that monitoring should take place. Such interception methods are e.g. described in WO 98/36548 and WO 97/41678. WO 98/36548 describes providing a database in a network component, in which relevant telecommunication data on subscribers to be monitored are stored and can be transmitted to one or more monitoring authorities. It is also mentioned to provide monitoring profiles. WO 97/41678 describes a process for monitoring a communications line, in which the call number of a subscriber who is to be under surveillance is characterized by an indication given to an agency authorized to monitor calls, and a three-way-conference-call is set up involving the subscriber under surveillance, a second party calling or being called, and the agency authorized to monitor the calls.

EP 0 792 074 describes a method of providing a service in a switched telecommunication system and a suitable message interceptor. This document generally describes the concept of an intelligent network IN and the possibility of providing specific services that are generated under certain trigger conditions, e.g. translating a called number into a different number. EP 0 792 074 also specifically mentions the concept of automated call interception, in which call attempts from a list of subscribers are automatically intercepted.

WO 97 25828 describes a cellular telecommunications system having selectively associatable usage parameters. It discusses the possibility of providing a virtual subscription, which means that a user can select any available cellular terminal and make an outgoing call, in contrast to the conventional cellular system, in which a specific subscription is always associated with a specific terminal. The system of virtual subscriptions is created by having three separate registers, one associated with a user, one with a subscription and one with a terminal.

WO 97 42784 relates to a method and apparatus for facilitating law enforcement agency monitoring of cellular telephone calls. This document specifically addresses the problem that in some cellular systems the signaling protocols only transport two numbers in connection with the set-up of a cellular call. Often, this means that there is no identification of the calling party in the call set-up signaling information. In the event that the called party triggers a monitoring procedure by e.g. the police, this means that it is not possible to identify the caller.

In order to overcome this problem, WO 97 42784 suggests using the fact that a billing operation for the calling party takes place, and that this billing operation can be used to identify the calling party.

SUMMARY

It is the object of the present invention to improve the manageability of a communications network that transports calls.

According to one aspect of the invention, this is achieved by a communication network having the features of claim 1 and by a method having the features of claim 26.

According to this first aspect, the communication network comprises a plurality of switching nodes and a service provision means, where said service provision means provides predetermined services in the communication network. A part of said service provision means is provided in at least one of the plurality of switching nodes. Furthermore, the service provision means is arranged to provide at least one service according to which the service provision means may set up calls in the switching node containing a part of the service provision means. In other words, non-dialable virtual subscriptions are provided. According to the invention, the service provision means adds user identification information to the call data of a call being set up, where the user identification information identifies the user requesting that the call be set up.

The term "call data" refers to all data in the switch related to a call, and preferably the user identification information is added to appropriate signaling information from a service control function to a service switching function. The user identification information may or may not be part of the connect data. The connect data is the data the switch uses to set up the call to the next exchange or direct destination.

In this way, it is possible to identify the subscriber, even if that subscriber is using a non-dialable virtual subscription. This increases network manageability, as it is possible to identify at the switching layer all subscribers using the network. More specifically, physical or real subscribers are already identified by their specific calling number, subscribers to dialable virtual subscriptions are also typically identified by the number to be dialed and, in accordance with the present invention, the subscribers to non-dialable subscriptions in an intelligent network system are also identifiable at the network switching layer.

This is especially advantageous in connection with the lawful interception or monitoring of telephone calls. As already mentioned previously, it is often necessary to provide for the monitoring of subscribers to a network. Previously it was however not possible to intercept a monitoring target using a non-dialable virtual subscription before call connect, i.e. during the phase preceding the in-band communication between two or more subscribers. Moreover, such a process of "listening in" on the in-band authorisation procedure for a virtual subscription call is complicated and produces a great amount of overhead. The call set up by the conventional non-dialable virtual subscription did not contain any information on the subscriber behind the call. The connect information will typically contain data on the terminals being used, because for the communication, the information transported is based on the physical subscriptions (e.g. the calling number of the actual telephone being used). This information will however usually not help in identifying the actual user, because typically non-dialable services are ordered from a terminal not associated fixedly with a user, such as e.g. a hotel telephone. The present invention is very advantageous in comparison thereto, because the information identifying the subscriber behind the non-dialable virtual subscription is contained in the call data given by the IN service to the switch, such that an interception may be performed by monitoring the call set up data in well-known ways.

There are many ways of adding the above-mentioned user identification data to the call data, e.g. by changing the protocol for call data by adding a new specific field identifying user identification information, or by exploiting unused fields in known call protocols. The exploitation of unused fields in established protocols has the important advantage that no new standards have to be created and a complete compatibility with existing systems is retained. The coding of the user identification information can also be done in any appropriate way, e.g. by a number scheme, by other identifiers, or by adding a completely new specific message to uniquely identify the subscriber.

According to a second aspect of the present invention described in claim 27, a capability is provided, according to which changes in user data of virtual subscriptions is communicated to a monitoring agency under-predetermined conditions. This makes the monitoring capabilities of the network more effective, because changes in the user profile can be detected.

The above mentioned first and second aspects are preferably combined.

BRIEF DESCRIPTION OF DRAWINGS

The features and advantages of the present invention will be better understood from the following detailed description, in which reference is made to the accompanying figures.

DETAILED DESCRIPTION

In the following, a detailed embodiment of the present invention will be described. In order to avoid unnecessary repetition, the introductory portion of the present application is incorporated into the disclosure of the invention.

Figure 1:
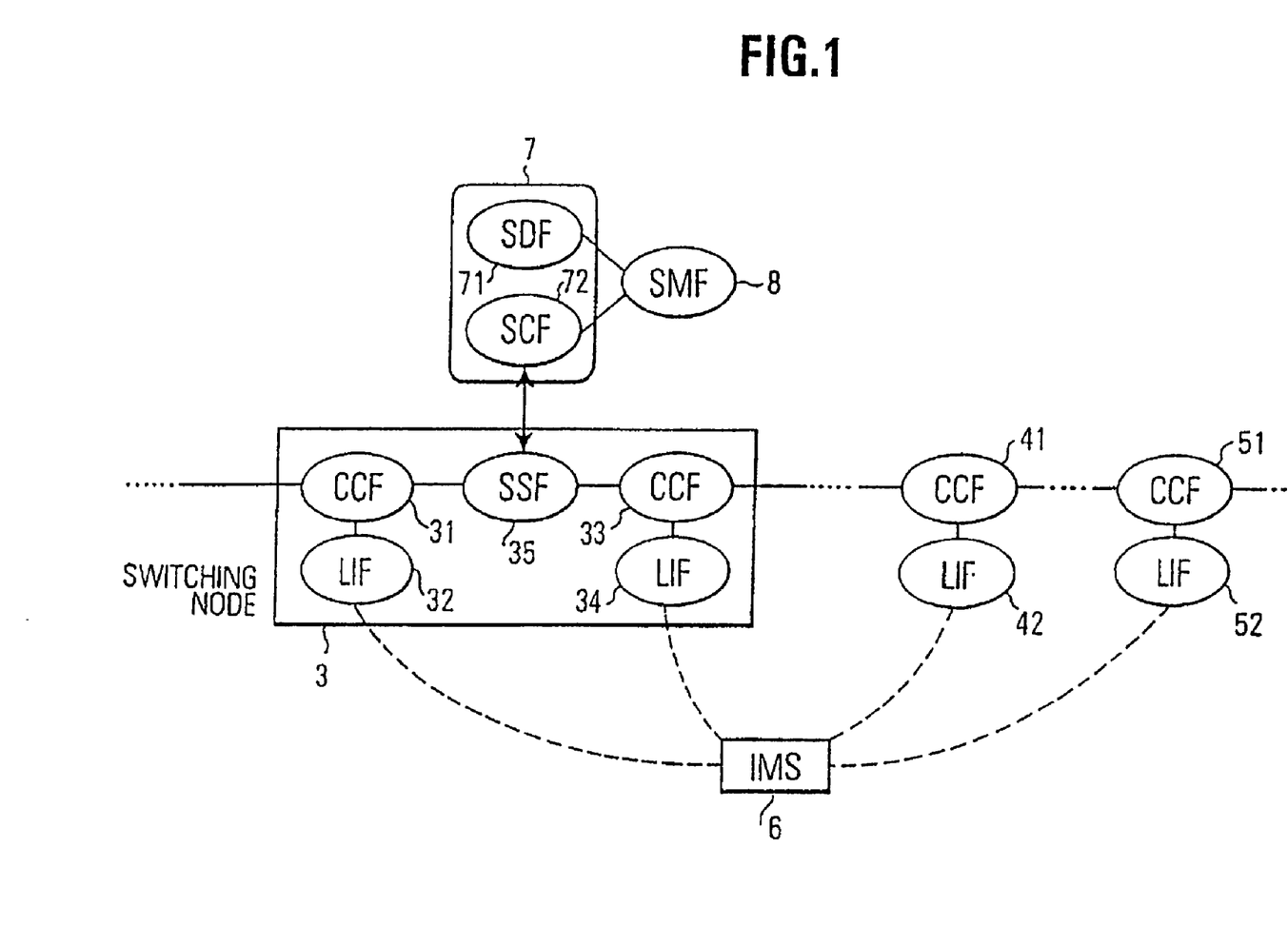
FIG. 1 shows a schematic illustration of parts of the communication network.

FIG. 1 shows a switching node 3 containing call control functions (CCF) 31 and 33. The call control function is the basic function for call control and switching node, e.g. routing, charging etc. Furthermore, a service switching function (SSF) 35 is provided in the switching node 3. The service switching function 35 is a part of a service provision means for intelligent network services. The service provision means furthermore comprises a service control function (SCF) 72, a service data function (SDF) 71 and a service management function (SMF) 8. In the example of FIG. 1, the service data function 71 and the service control function 72 are provided at a service control point 7.

It should be noted that the individual functions shown in FIG. 1 are logical entities, which may correspond to physical entities, but this is not a necessity. In other words, the individual functions may be contained in individual physical components, but they may also be implemented together in any desirable way. In this sense, certain functions depicted as entities in FIG. 1 may actually be physically spread out over separate physical units. For example, it is possible that the service switching function 35 is distributed over a plurality of switching nodes and the service control function 72 may serve a plurality of service switching points.

The intelligent network action provided by the service provision means is invoked by the service switching function 35 detecting predetermined service triggering information in the connect data of a call. To this end, the service switching function 35 will typically have an associated storage means (not shown) that contains the triggering information, e.g. specific call numbers or number combinations. An example of triggering information is a specific set of numbers positioned like an area code, e.g. 0130 for toll-free calls in Germany. Once the service switching function 35 has detected one of the stored triggering numbers, a service invocation operation is conducted. In the course of this operation, the service switching function 35 contacts the service control function 72. The communication between the service switching function 35 and the service control function 72 is conducted in accordance with a so-called intelligent network application protocol (INAP). This protocol constitutes an interface and consists of a set of models (e.g. final state machines, FSMs) that describes the state and behaviour of the involved entities (e.g. SSF and SCF), and a set of operations that allows the service control function 72 to give instructions to the service switching function, and allows the service switching function 35 to report the occurrence of events to the service control function 72.

The service control point 7 will typically be separated from the switching node, and a plurality of service switching functions in a plurality of nodes will be connected to the centralized service control point 7. FIG. 1 only shows one service switching function for the sake of simplicity.

The service control function 72 controls the actions invoked by the triggering of the service switching function 35. The service control function typically also includes service and subscriber data profiles. This will be explained in more detail with reference to FIGS. 2a and 2b.

The service data function 71 stores relevant data on services provided by the service provision means, and user data associated therewith. In other words, the service data function 71 may provide the service control function with data.

Figure 2A:
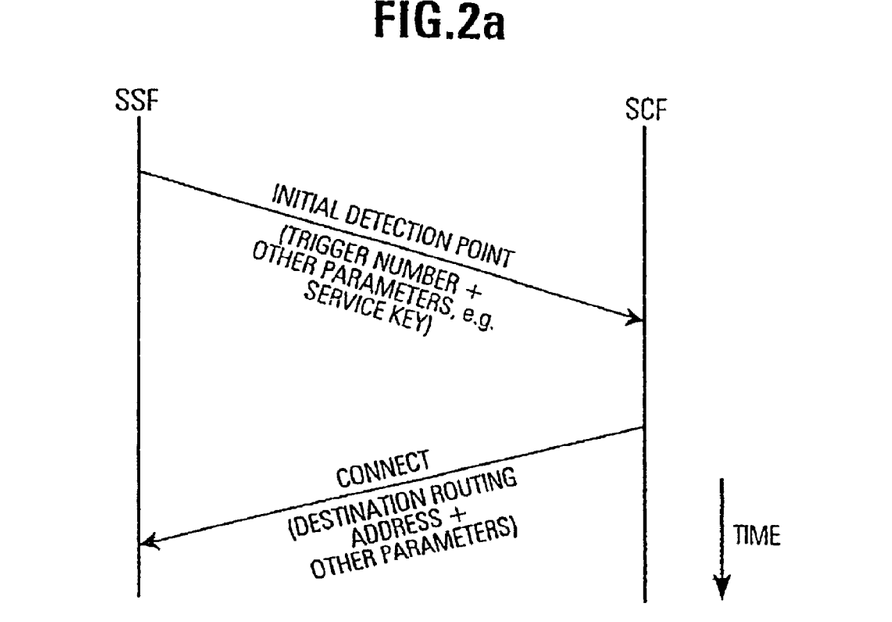
FIGS. 2a and 2b show a communication between a service switching function and a service control function.

In FIG. 2a, the service switching function, after having detected predetermined triggering information in the call connect data of a call being routed by the switching node 3, sends the trigger number and other parameters, e.g. a service key, to the service control function 72. The service control function processes this data appropriately, and determines which service is being invoked and how the call is to be handled. In the example of FIG. 2a the invoked service relates to the routing of the call, such that the service control function 72 provides a connect command to the service switching function 35, which contains the destination routing address. An example of such a service is the dialing of a toll-free number that does not correspond to a physical line or destination. Much rather the service control function must provide the switching node 3 with routing information for routing the call to an appropriate physical destination.

Figure 2B:
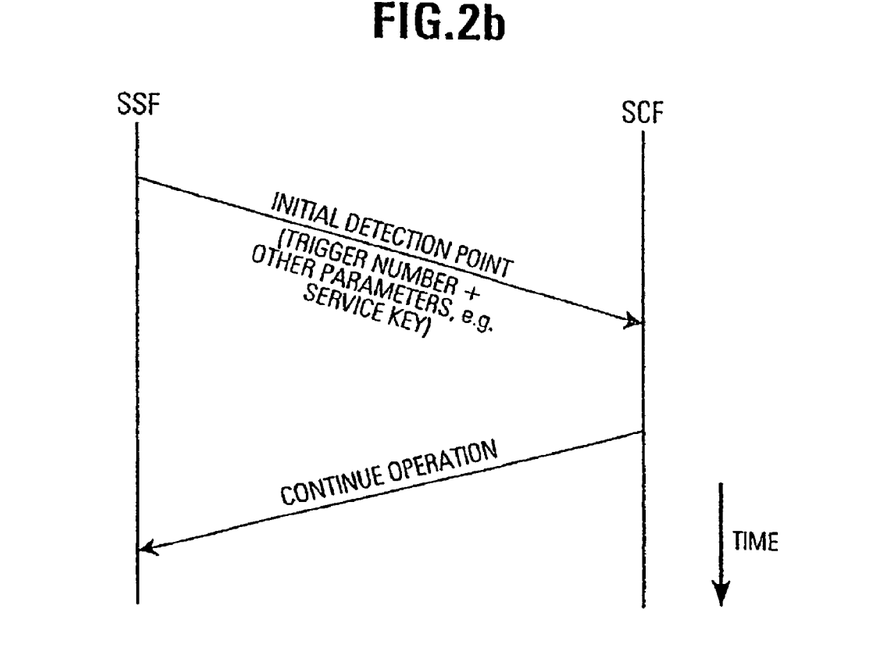

As already mentioned previously, it is equally well possible that the triggering information or triggering number only corresponds to the registration of information in the service control function 72, as shown in the example of FIG. 2b. In the example of FIG. 2b, the service switching function is triggered just as in the case of FIG. 2a, however the service control function 72 responds thereto by simply sending a continue-operation-command, such that the service switching function 35 in the switching node 3 routes the call to the destination originally indicated in the call. An example of the operation shown in FIG. 2b is if the network provider wishes to gain statistical data on specific call information, e.g. on called numbers during certain times of day, on certain calling party numbers, etc.

The service provision means also comprises a service management function 8. The service management function controls the updating of the data in the service control function 72 and the service data function 71 and the updating of the control routines of the service control function 72.

In accordance with the present invention, when the service invoked by the triggering information in a call is a non-dialable virtual subscription, the service control function 72 automatically adds user identification information to that call triggering that service. In other words, user identification information is sent from the service control function 72 in an appropriate command, similar to the command shown in the bottom part of FIGS. 2a and 2b.

The user identification information can be in any desired form. In other words, it is possible that the user identification information is simply a number associated with the user, but it can also be more complicated. As an example, it is possible that the home telephone number of the user is employed as a user identification number, but it is equally well possible that each service user is assigned a unique number which at the same time also identifies the service. In other words, according to a preferred embodiment, the service control function 72 not only sends user identification information to be added to the call, but also sends service identification information to be added to the call by the service switching function 35. The user identification information and service identification information may be one piece of data (i.e. one number), or two separate pieces of data.

The user identification information or service identification information is transported from the service control function 72 to the service switching function by the above-mentioned intelligent network application protocol (INAP). In other words, the INAP will specify a specific format and field for this user identification information and service identification information.

The service switching function 35 will then add this information to the connect data of the call having invoked the intelligent network operation described above. This can be done in a number of ways. As a preliminary remark, it should be mentioned that the call connect data is specified by an appropriate call connect protocol peculiar to the network. This protocol will specify the format and fields for call connect information, such as the called party number (CdBN), the calling party number (CPN), the originally called party number (OCN), the redirecting number (RDN), etc. As an example, such information will be sent in frames, where the call connect protocol specifies an identifier for the type of data being transported in the header of the frame, such that any component in the network will be able to identify what kind of data is contained in the frame, and the protocol will also specify how the data is coded, such that the component is able to determine the data.

Typically, the call connect protocol will also specify such addresses or fields in these frames, which are not used by said call connect protocol. While the fields reserved by the protocol may only be used as specified by the protocol, the non-reserved fields may be used in an individual way by individual implementations without running into conflict with the protocol.

A first possibility of adding the user identification information or the service identification information to the call connect data, is to define a specific header identifier and field or address for said information. In other words, this means changing the standard of the call connect protocol.

Another possibility is to only change the implementation of the call connect protocol in such a way that the fields not used by the standard protocol are employed for transporting the user identification information and the service identification information. This concept has the advantage that the standard for the call control does not need to be changed, and a full compatibility to existing standards is retained.

Another possibility of adding the information is to manipulate the already existing call connect data. In other words, it would be possible to change one of the used call connect numbers, such as the calling party number (CPN) or other appropriate data in the call. However, the possibilities of manipulating call connect data of the call triggering the intelligent network operation is typically restricted by telecommunication regulations, so that this concept has the disadvantage of not providing unlimited degrees of variation, but nevertheless has the advantage of being fairly simple to implement.

Due to the addition of the user identification information and possibly the service identification information, the communications network of the present invention increases the manageability of the network on the network switching layer. This will be explained in detail with respect to the preferred embodiment of performing a call interception operation at the network switching level.

Very specifically, FIG. 1 shows lawful interception functions (LIF) 32, 34, 42 and 52. These lawful interception functions are respectively associated with corresponding call control functions 31, 33, 41, 51. The lawful interception functions will contain a storage means in which interception trigger information is stored, such that when such interception triggering information is found in the call connect data of a call being routed by the call connect function, the lawful interception function will initiate an interception operation. Preferably, the lawful interception function is implemented as a part of the call control function.

The arrangement of interception functions at the switching layer, i.e. in conjunction with the call control function, and not in connection with the intelligent network functions, has the advantage of increased security. More specifically, there are many INAP standards and many variants of service control points 7. Many of these variants are based on general purpose computers. There is also a trend to distribute the service control function in many types of nodes with different purposes. From a data security point of view, a general purpose computer is more difficult to protect, according to the strict regulation required by the intercept function. Here, an implementation of the interception function on the network switching layer provides advantages.

The various lawful interception functions all are arranged to communicate with an interception management system (IMS) 6, where said interception management system 6 contains a database for storing data collected by the lawful interception function, i.e. call data of intercepted calls, and the interception management system controls and updates the contents of the lawful interception functions, such that the lawful interception functions are provided with the interception triggering data necessary for their operation. Furthermore, the operation routines of the lawful interception functions may be updated via the interception management system 6. The communication between the interception management system 6 and the lawful interception functions is illustrated by dashed lines in FIG. 1, which indicates that this information is provided to one or more LIFs by the IMS.

As can be seen in FIG. 1, preferably a lawful interception function is associated with each call control function. This, however, means that an interception operation may be invoked more than one time by a single call. To accommodate this situation, the lawful interception functions output call data in chronological order, and said call data is linked by a correlation number, such that the interception management system is capable of acting accordingly. The call interception operation performed by the lawful interception function may consist in a number of actions. One typical possibility is that a three-way conference call will be set up, namely between the calling party, the called party and a monitoring agency identified in association with the triggering information for that specific call, where naturally the three-way conference call is arranged in such a way that neither the calling party nor the called party are aware thereof. In order to guarantee that only one three-way conference call will be arranged for a given call, the interception operation can suppress the successive, unnecessary conference calls.

The interception operations can be triggered by any appropriate interception triggering information. In other words, this can e.g. the called party number, the calling party number, or the subscriber identification information (and possibly service identification information) added in accordance with the present invention. In this way, any subscriber or user may be monitored, even a subscriber of a non-dialable virtual subscription. More specifically, standard subscribers to the network, which do not use any of the intelligent network possibilities, may be intercepted by the usual call connect data, such as the called party number, the calling party number or the access line monitoring. Equally, users of a dialable virtual subscription can be intercepted by the number of said virtual subscription, which typically identifies the subscriber. In accordance with the invention, it is also possible to intercept calls during the customer control phase of subscribers using a non-dialable virtual subscription, because the service-provision means adds subscriber identification information to the call set up to the non-dialable virtual subscription. The lawful interception functions simply need to be supplied with the subscriber identification information as an interception triggering information, in order to enable the lawful interception function to intercept such calls to a non-dialable virtual subscription by a subscriber who is targeted for monitoring.

As already mentioned previously, the service providing means comprising the service switching function, service control function, service data function and service management function typically stores service and user related data in the service control point 72 and the service data function 71. Usually, a method is provided, such that a user may change his user profile defined by his user data stored in the service control function 72. The access to the user data may be provided in a number of ways, e.g. via the communications network, i.e. the service switching function 35, the INAP and the service control function 72, or via the service management function 8. It may be noted that the access to the service management function can e.g. be provided via the Internet. Also, it is possible that the service provider modifies the user data via the service management function 8.

In accordance with a preferred embodiment of the present invention, measures are taken such that a monitoring agency may become aware of changes in the user data and service data. The simplest possibility of doing this, is to grant the monitoring agency direct and unlimited access to the service management function 81, e.g. via desktop integration, where the monitoring agency may view the actual forms that also the network operator uses to administer the subscriber profiles. In an alternative embodiment, the monitoring agency is notified by the service management function 81 if a change in user and/or service data has occurred. Preferably, the notification message will also contain information on the user whose data has changed, and which data has been changed. Alternatively, it is also possible that the service management function comprises a list of users to be monitored, and only notifies the monitoring agency when the data of a user mentioned in the list has changed.

Another possibility of selectively making the monitoring agency aware of changes in the user and service data, is to implement an activity indicator, which is to be sent from the concerned intelligent network element, i.e. the service control point 7, via INAP to the switching network, any time that any change of user data takes place in the service data function 71. The list of monitoring targets is stored in the form of interception triggering data in the lawful interception function, and said lawful interception function is arranged to respond to said activity indicator by checking to see if the user indicated in the activity indicator corresponds to a monitoring target identified by interception triggering information. If the user whose data has changed is a monitoring target, then an appropriate message identifying said user and possibly identifying the changes can be sent to the monitoring agency by the lawful interception function.

According to another embodiment, an activity indicator as mentioned above may be sent from the concerned intelligent network element through the interception monitoring system 6, where a list of monitoring targets is already stored. The interception monitoring system 6 then decides if an appropriate message shall be sent to the monitoring agency. Again, as in the previous cases, an indication of which data has changed may also be sent to the monitoring agency.

As an alternative to all of the above embodiments in which information on the changes is sent to the monitoring agency, it is equally well possible that, when a message is sent to the monitoring agency that the data for a specific user has changed, then the monitoring agency is granted full access to said user's data in the service data function 71.

Although the present invention has been described above in terms of a detailed example, this description of a detailed example serves to help a skilled person to completely understand the invention, and is not intended to restrict the scope. Much rather, the scope of the present invention is defined by the dependent claims. Reference signs in the claims are intended to increase legibility and also do not restrict the scope.

The invention claimed is:

1. A communication network for transporting calls, comprising:
   a plurality of switching nodes, each switching node containing routing means for routing calls through said communication network;
   service provision means fox providing predetermined services in said communication network, where at least a part of said service provision means is provided in at least one of said plurality of switching nodes, said service provision means being arranged to provide at least one service according to which said service provision means are able to set up calls in said at least one switching node in response to the request of a virtual subscriber requesting that a call be set up in accordance with a non-dialable virtual subscription, and said service provision means being arranged to add virtual subscriber identification information to the call data of a call set up by said service provision means for allowing interception of said call.

2. A communication network according to claim 1, further comprising call interception means for performing a call interception operation on a call in said communication network in response to detecting predetermined interception trigger information in the call data of a call.

3. A communication network according to claim 2, wherein said call interception means is arranged to be able to detect said user identification information as said interception trigger information.

4. A communication network according to claim 2, wherein a respective call interception means is provided in association with each routing means in each of said plurality of switching nodes.

5. A communication network of claim 4, wherein said call interception means is provided as part of said routing means.

6. A communication network according to claim 2, wherein said call interception means contains a memory means for storing said interception triggering information, and is arranged to communicate with an interception management means, such that said interception management means provides said call interception means with the interception trigger information and controls the content of said memory means.

7. A communication network according to claim 6, wherein said call interception means is arranged such that said call interception operation comprises sending data from an intercepted call to said interception management means.

8. A communication network according to claim 2, wherein said call interception means is arranged such that said call interception operation comprises establishing a three-way conference call for an intercepted call, where one of the destinations is the origin of the call, one is the one or more physical destinations specified in the call, and one is a monitoring agency.

9. A communication network according to claim 1, wherein said service provision means comprise:
   a service switching means provided in a switching node of said network for detecting service triggering information in a call,
   a service control means that is arranged to communicate with said service switching means, such that said service switching means notifies said service control means upon detecting service triggering information in a call and said service control means instructs said service switching means how to proceed with said call containing said service triggering information and provides said service switching means with said user identification information.

10. A communication network according to claim 9, further comprising
a service data means for storing data on provided services and data on users subscribing to specific services, and
a service management means for managing which services aye provided and for controlling the writing of data into said service data means.

11. A communication network according to claim 1, wherein said service provision means are furthermore arranged to add service identification information to the call data of a call being set up by said service provision means, said service identification information identifying the service that said user requesting that a call be set up has invoked.

12. A communication network according to claim 1, wherein said service provision means comprise a service data means, in which user data associated with users of provided services and service data associated with provided services are stored, said service provision means being arranged such that a user has access to at least a part of the user data associated with him and may change said user data to which he has access.

13. A communication network according to claim 12, wherein said service provision means further comprise a service switching means provided in a switching node of said network for detecting service triggering information in a call, and a service control means that is arranged to communicate with said service switching means and said service data means, where said service switching means notifies said service control means upon detecting service triggering information in a call and said service control means instructs said service switching means how to proceed with said call containing said service triggering information and provides said service switching means with said user identification information, and where said user has access to said at least part of his user data via said communication network and said service switching means.

14. A communication network according to claim 12, wherein said service provision means is arranged to communicate with a computer network, and where said user has access to said at least part of his user data via said computer network.

15. A communication network according to claim 14, wherein said computer network is the Internet.

16. A communication network according to claim 12, wherein said service provision means are arranged to provide a monitoring agency continuous access to user data of selected users.

17. A communication network according to claim 12, wherein said service provision means are arranged to perform a user data change interception operation in response to a user changing his user data.

18. A communication network according to claim 1, said communication network comprising call interception means for performing a call interception operation on a call in said communication network in response to detecting predetermined interception trigger information in the call data of said call, said call interception means being ranged to be able to detect said user identification information as said interception trigger information and having a memory means for storing said interception trigger information,
said service provision means comprising a service data means, in which user data associated with users of provided services and service data associated with provided services are stored, said service provision means being arranged such that a user has access to at least a part of the user data associated with him and may change said user data associated with him to which he has access, and said service provision means being arranged to perform a user data change interception operation in response to a user changing his user data,
where said user data change interception operation comprises sending user identification information associated with the user who changed his user data to the call interception means, and said call interception means being arranged to compare said user identification information with interception trigger information stored in said memory means and sending a user data change message to a monitoring agency if said user identification information matches with a piece of interception trigger information stored in said memory means.

19. A communication network according to claim 18, wherein said user data change message contains information on the user who changed his user data and information at least on the changes performed.

20. A communication network according to claim 1, said communication network comprising call interception means for performing a call interception operation on a call in said communication network in response to detecting predetermined interception trigger information in the call data of said call, said call interception means being arranged to be able to detect said user identification information as said interception trigger information and having a memory means for storing said interception trigger information, and is arranged to communicate with an interception management means, such that said interception management means provides said call interception means with the interception trigger information and controls the content of said memory means,
said service provision means comprising a service data means, in which user data associated with users of provided services and service data associated with provided services are stored, said service provision means being arranged such that a user has access to at least a part of the user data associated with him and may change said user data associated with him to which he has access, and said service provision means being arranged to perform a user data change interception operation in response to a user changing his user data,
where said user data change interception operation comprises sending user identification information associated with the user who changed his user data to the interception management means, and said interception management means being arranged to compare said user identification information with interception trigger information stored in said interception management means and sending a user data change message to a monitoring agency if said user identification information matches with a piece of interception trigger information stored in said interception management means.

21. A communication network according to claim 20, wherein said user data change message contains information on the user who changed his user data and information at least on the changes performed.

22. A communication network according to claim 1, wherein the format of the call data for a call being transported through said communication network is specified by a predetermined call data protocol and said call data protocol specifies fields for predetermined types of call data and fields which are not used by said call data protocol.

23. A communication network according to claim 22, wherein said service provision means adds said user identification information to said call data by manipulating data in a field specified for predetermined types of call data.

24. A communication network according to claim 23, wherein said call data protocol specifies a format and field for user identification information.

25. A communication network according to claim 22, wherein said service provision means adds said user identification information to said call data by manipulating data in a field not used by said call data protocol.

26. A method of arranging a service provision means providing predetermined services in a communications network for transporting calls, said communication network having a plurality of switching nodes, each switching node containing routing means for routing calls through said communication network, said method comprising;
   providing at least a part of said service provision means in at least one of said plurality of switching nodes,
   arranging said service provision means to provide at least one service according to which said service provision means are able to set up calls in said at least one switching node in response to the request of a virtual subscriber requesting that a call be set up in accordance with a non-dialable virtual subscription, and
   arranging said service provision means to add virtual subscriber identification information to the call data of a call set up by said service provision means for allowing interception of said call.

27. A communication network for transporting calls, comprising:
   a plurality of switching nodes, each switching node containing routing means for routing calls through said communication network;
   service provision means for providing predetermined services in said communication network, said service provision means comprising a service data means in which user data associated with users of provided services and service data associated with provided services are stored, said service provision means being arranged such that a user has access to at least a part of the user data associated with him and may change said user data to which he has access,
   wherein said service provision means are arranged;
   to provide a monitoring agency continuous access to user data of selected users, or to perform a user data change interception operation in response to a user changing his user data, and
   to provide at least one service according to which said service provision means are able to set up calls in said at least one switching node in response to the request of a virtual subscriber requesting that a call be set up in accordance with a non-dialable virtual subscription.

28. A communication network according to claim 27, wherein said service provision means further comprise a service switching means provided in a switching node of said network for detecting service triggering information in a call, and a service control means that is arranged to communicate with said service switching means and said service data means, where said service switching means notifies said service control means upon detecting service triggering information in a call and said service control means instructs said service switching means how to proceed with said call containing said service triggering information and provides said service switching means with said user identification information, and where said user has access to said at least part of his user data via said communication network and said service switching means.

29. A communication network according to claim 27, wherein said service provision means is arranged to communicate with a computer network, and where said user has access to said at least part of his user data via said computer network.

30. A communication network according to claim 29, wherein said computer network is the Internet.

31. A communication network according to claim 27, said communication network comprising call interception means for performing a call interception operation on a call in said communication network in response to detecting predetermined interception trigger information in the call data of said call, said call interception means being arranged to be able to detect user identification information that identifies users of services provided by said service provision means as said interception trigger information and having a memory means for storing said interception trigger information,
   where said user data change interception operation comprises sending user identification information associated with the user who changed his user data to the call interception means, and said call interception means being arranged to compare said user identification information with interception trigger information stored in said memory means and sending a user data change message to a monitoring agency if said user identification information matches with a piece of interception trigger information stored in said memory means.

32. A communication network according to claim 31, wherein said user data change message contains information on the user who changed his user data and information at least on the changes performed.

33. A communication network according to claim 27, said communication network comprising call interception means for performing a call interception operation on a call in said communication network in response to detecting predetermined interception trigger information in the call data of said call, said call interception means being arranged to be able to detect identification information that identifies users of services provided by said service provision means as said interception trigger information, and having a memory means for storing said interception trigger information, and is arranged to communicate with an interception management means, such that said interception management means provides said call interception means with the interception trigger information and controls the content of said memory means,
   where said user data change interception operation comprises sending user identification information associated with the user who changed his user data to the interception management means, and said interception management means being arranged to compare said user identification information with interception trigger information stored in said interception management means and sending a user data change message to a monitoring agency if said user identification information matches with a piece of interception trigger information stored in said interception management means.

34. A communication network according to claim 33, wherein said user data change message contains information on the user who changed his user data and information at least on the changes performed.

35. Apparatus for use in a communication network including a plurality of switching nodes for transporting calls and for providing predetermined services, each switching node including a router for routing calls through said communication network, the apparatus comprising:
  electronic circuitry configured to assist in setting up a call in one of the switching nodes in response to a virtual subscriber requesting that a call be set up and to add virtual subscriber identification information to call data of the set up call,
  wherein the virtual subscriber has a non-dialable type virtual subscription that is not associated with an access point to the communication network and which permits only incoming calls addressed to the virtual subscriber, and wherein the call is associated with the virtual subscription.

36. The apparatus according to claim 35, further comprising call interception circuitry configured to perform a call interception operation in response to detecting said virtual subscriber identification information in the call data of a call.

37. The apparatus according to claim 36, wherein said call interception operation includes sending data from an intercepted call to an interception management entity.

38. The apparatus according to claim 37, wherein said call interception operation includes establishing a three-way conference call for an intercepted call, where one destination is an origin of the call, one destination is one or more physical destinations specified in the call, and one destination is a monitoring agency.

39. The apparatus in claim 35, wherein the virtual subscriber may access the communication network, via any access point, and an identification of that access point is not specifically associated with the virtual subscriber.

40. The apparatus in claim 35, wherein when the virtual subscriber accesses the communication network at an access point, identification of that access point does not provide a trigger for an interception operation because that access point is not specifically associated with the virtual subscriber.

41. A method of providing predetermined services in a communication network for transporting calls, said communication network having a plurality of switching nodes, each switching node containing a router for routing calls through said communication network, said method comprising:
  providing a communications service to set up a call in at least one switching node in response to a request of a virtual subscriber for service, and
  adding virtual subscriber identification information to the call data of the set up calls,
  wherein the virtual subscriber has a non-dialable type virtual subscription that is not associated with an access point to the communication network and which permits only incoming calls addressed to the virtual subscriber, and wherein the call is associated with the virtual subscription.

42. The method in claim 41, wherein the virtual subscriber access the communication network via any access point, and an identification of that access point is not specifically associated with the virtual subscriber.

43. The apparatus in claim 42, wherein when the virtual subscriber accesses the communication network at an access point, identification of that access point does not provide a trigger for an interception operation because that access point is not specifically associated with the virtual subscriber.

* * * * *